US007773519B2

(12) United States Patent
Prabhakar et al.

(10) Patent No.: US 7,773,519 B2
(45) Date of Patent: Aug. 10, 2010

(54) METHOD AND SYSTEM TO MANAGE NETWORK TRAFFIC CONGESTION

(75) Inventors: Balaji Prabhakar, Palo Alto, CA (US); Peter Newman, Fremont, CA (US)

(73) Assignee: Nuova Systems, Inc., San Jose, CA (US)

( * ) Notice: Subject to any disclaimer, the term of this patent is extended or adjusted under 35 U.S.C. 154(b) by 187 days.

(21) Appl. No.: 11/972,055

(22) Filed: Jan. 10, 2008

(65) Prior Publication Data

US 2009/0180380 A1 Jul. 16, 2009

(51) Int. Cl.
*H04L 12/26* (2006.01)
*H04L 12/56* (2006.01)
(52) U.S. Cl. .................... 370/232; 370/230.1; 370/235; 370/236
(58) Field of Classification Search ................. 370/229, 370/230, 230.1, 232, 234, 235, 236
See application file for complete search history.

(56) References Cited

U.S. PATENT DOCUMENTS

| 6,765,873 | B1* | 7/2004 | Fichou et al. | ............... 370/235 |
| 6,862,298 | B1* | 3/2005 | Smith et al. | ................. 370/516 |
| 7,058,723 | B2 | 6/2006 | Wilson | |
| 7,206,285 | B2* | 4/2007 | Loguinov | ................... 370/235 |
| 7,369,498 | B1* | 5/2008 | Ma et al. | .................... 370/235 |
| 2001/0012270 | A1 | 8/2001 | Godoroja | |
| 2003/0099197 | A1 | 5/2003 | Yokota et al. | |
| 2006/0209684 | A1 | 9/2006 | Bei | |
| 2007/0081454 | A1* | 4/2007 | Bergamasco et al. | ........ 370/229 |
| 2007/0223383 | A1 | 9/2007 | Kamath et al. | |
| 2008/0267073 | A1* | 10/2008 | Thaler | ........................ 370/236 |
| 2008/0298232 | A1 | 12/2008 | Fan et al. | |

(Continued)

FOREIGN PATENT DOCUMENTS

WO    WO-2009117508 A1    9/2009

OTHER PUBLICATIONS

Jiang et al, Analysis of Backward Congestion Notification (BCN) for Ethernet in Datacenter Applications, IEEE2007, pp. 2456-2460.*

(Continued)

*Primary Examiner*—Chi H Pham
*Assistant Examiner*—Ahmed Elallam
(74) *Attorney, Agent, or Firm*—Schwegman, Lundberg & Woessner, P.A.

(57) ABSTRACT

A method and system to manage network congestion are provided. In one example embodiment, the system comprises a congestion point queue, a monitor to sample a state of the congestion point queue, a consolidated parameter generator to generate a consolidated feedback parameter, and a feedback message generator to generate a feedback message, utilizing the consolidated feedback parameter. The congestion point queue may be configured to queue messages from a reaction point to a congestion point. The state of the congestion point queue may be reflected by an equilibrium queue level, a queue offset, and a rate of change of a size of the congestion point queue. The equilibrium queue level may represent a particular predetermined size of the congestion point queue. The queue offset may represent a deviation from the equilibrium queue level. The consolidated feedback parameter may be generated to reflect the queue offset and the rate of change of the size of the congestion point queue.

20 Claims, 6 Drawing Sheets

U.S. PATENT DOCUMENTS

2008/0298248 A1* 12/2008 Roeck et al. ................ 370/237
2009/0052326 A1* 2/2009 Bergamasco et al. ........ 370/236
2009/0238070 A1 9/2009 Rivers et al.

OTHER PUBLICATIONS

"International Application Serial No. PCT/US2009/039784, International Search Report mailed May 28, 2009", 4 pgs.

"International Application Serial No. PCT/US2009/39784, Written Opinion mailed May 28, 2009", 6 pgs.

"International Application Serial No. PCT/US2009/037551, Search Report mailed Aug. 31, 2009", 4 pgs.

"International Application Serial No. PCT/US2009/037551, Written Opinion mailed Aug. 31, 2009", 6 pgs.

* cited by examiner

METHOD AND SYSTEM TO MANAGE NETWORK TRAFFIC CONGESTION

FIELD

This application relates to a method and system to manage network traffic congestion.

BACKGROUND

Congestion is the networking term that refers to a situation where too much network traffic is clogging network pathways. Common causes of congestion may include too many users on a single network segment or collision domain, high demand from bandwidth-intensive networked applications, a rapidly growing number of users accessing the Internet, and the increased power of personal computers (PCs) and servers, etc. "Transient congestion" refers to congestion caused by temporary oversubscription of a network link due to a burst of packets arriving to a buffer provided at a network device. "Sustained congestion" refers to a situation where a long-term arrival rate of packets at a network device exceeds the capacity of the device.

Some existing systems may be configured to handle congestion at the device level or at the transport layer level. Device level algorithms may be utilized to alleviate transient congestion, while the transport level algorithms may be utilized to alleviate sustained congestion. Device level algorithms typically require dropping packets with increasing probability as buffer congestion increases, e.g., if a packet arrives at a full buffer, the packet is dropped. Transport level algorithms may be configured to utilize marked packets to adjust transmission rate of source network devices.

Some common indicators of network traffic congestion include increased network delay. All networks have a limited data-carrying capacity. When the load is light, the average time from when a host submits a packet for transmission until it is actually sent on the network is relatively short. When many users are vying for connections and communicating, the average delay increases. This delay has the effect of making the network appear "slower," because it takes longer to send the same amount of data under congested conditions than it does when the load is light.

In extreme circumstances, an application can fail completely under a heavy network load. Sessions may timeout and disconnect, and applications or operating systems may crash, requiring a system restart.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

Overview

Figure 1:
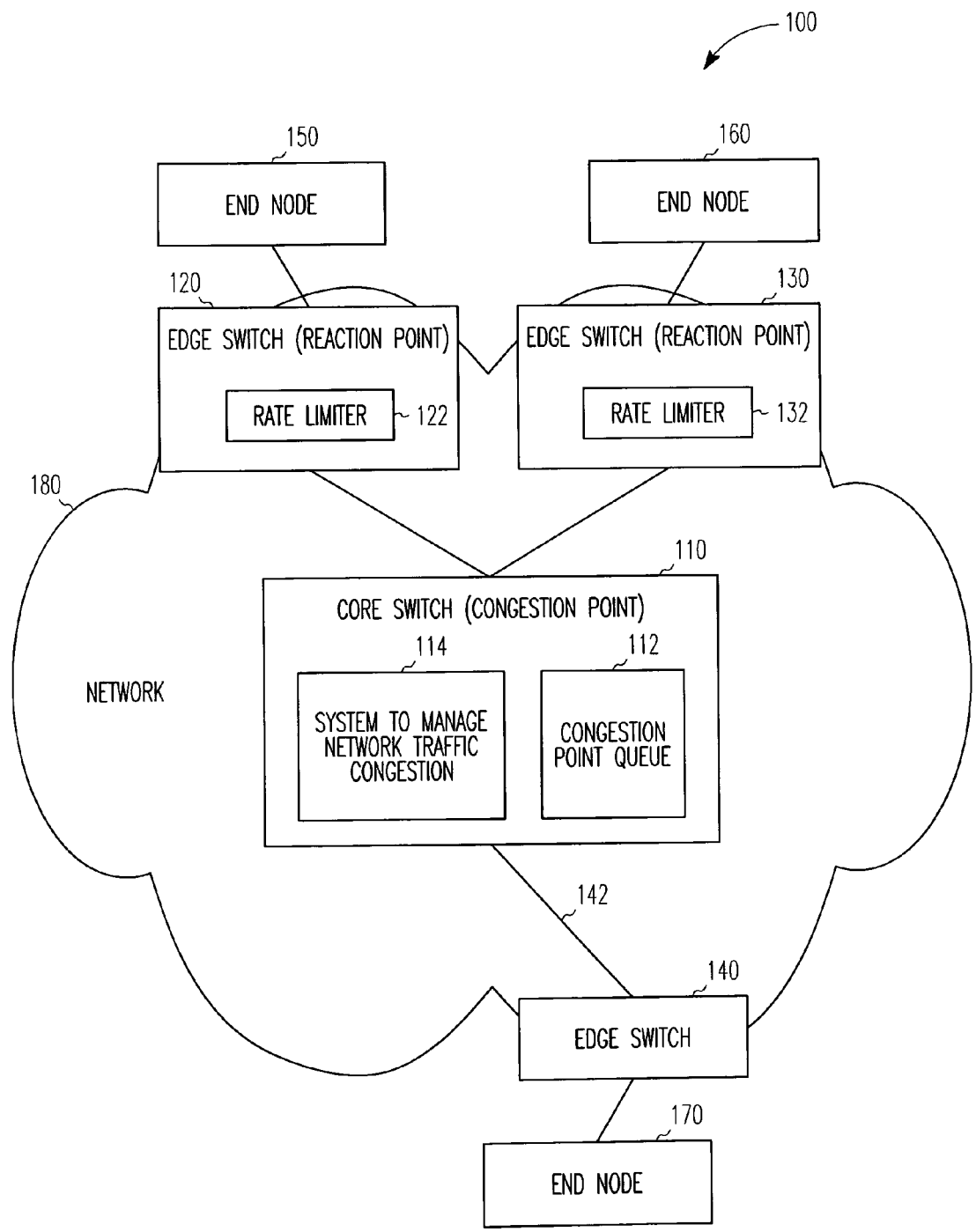
FIG. 1 is a diagrammatic representation of a network environment within which an example embodiment may be implemented.

A method and system to manage network congestion are provided. In one example embodiment, the system comprises a congestion point queue, a monitor to sample a state of the congestion point queue, a consolidated parameter generator to generate a consolidated feedback parameter, and a feedback message generator to generate a feedback message, utilizing the consolidated feedback parameter. The congestion point queue may be configured to queue messages from a reaction point to a congestion point. The state of the congestion point queue may be reflected by an equilibrium queue level, a queue offset, and a rate of change of a size of the congestion point queue. The equilibrium queue level may represent a particular predetermined size of the congestion point queue. The queue offset may represent a deviation form the equilibrium queue level. The consolidated feedback parameter may be generated to reflect the queue offset and the rate of change of the size of the congestion point queue.

Example Embodiments

In one example embodiment, a system is provided to manage congestion that may reduce the amount of signal space required to send congestion management information from a device at which congestion occurs to the device that is the source of the network traffic. Congestion management information may be sent in the form of a feedback message (sometimes referred to as a notification message). A feedback message may include various parameters, e.g., parameters reflecting the presence or the absence of congestion at the network device, values associated with the size of a buffer configured to queue the received network packets for further processing, parameters indicating the responsiveness of the network, as well as various other information. In one example embodiment, some of the parameters may be consolidated at the network device in order to reduce the number of values communicated within a feedback message and reduce the size of a signal space associated with the feedback message.

For example, a value representing a deviation from a desirable size of a buffer configured to queue the received network packets may be consolidated with one or more other values, e.g., the value representing the rate of change of the queue size. The resulting single value may be included in a feedback message instead of including both original values in the feedback message. The resulting consolidated value may be further processed prior to being sent within a feedback message. For example, the generated consolidated value may be first rounded up or down to one of predetermined discrete values utilizing a quantization technique.

In one embodiment, any of the parameters reflecting network congestion may be quantized in order to contribute to conserving bandwidth by reducing the amount of signal space size. Another technique to conserve bandwidth in the process of congestion management may include, in one example embodiment, suppressing a feedback message if the determined parameter that reflects a level of congestion indicates lack of congestion or an ability of the network device to process an increased volume of network traffic. The techniques to manage network congestion, also described in further detail below, may be combined in various manners to achieve a desired level of simplification, efficiency, and scalability. A network environment within which an example system to manage network congestion may be implemented may be described with reference to FIG. 1.

In networking, a network flow from a traffic source directed to a traffic destination (sometimes referred to as a traffic sink) may go though one or more interconnect devices, such as, for example, network switches and network routers. An interconnect device that is responsible for forwarding network flow from the source of traffic to the traffic sink may maintain a queue to facilitate storing and processing of the incoming traffic. As shown in FIG. 1, a core switch 110 and switches 120, 130, and 140 are positioned within network environment 100 to permit the flow of network traffic from end nodes 150 and 160 to an end node 170. The end nodes 150 and 160 may simultaneously send network traffic at a line rate of, e.g., 10 Gigabytes per second (Gbps), to the end node 170, via a communications network 180. The communications network 180 may be a public network (e.g., the Internet, a wireless network, etc.) or a private network (e.g., LAN, WAN, Intranet, etc.).

The messages that arrive at the core switch 110 maybe queued in an associated queue 112 until resources become available for further processing of each incoming message. The aggregate rate of traffic originating from the end nodes 150 and 160 may exceed the capacity of a link 142 connecting the core switch 110 to the edge switch 140. Furthermore, the core switch 110, may be unable to process the incoming messages (or frames) at the rate the messages are arriving from the edge switches 120 and 130, which may result in an overflow of the queue 112. An overflow of the queue 112 refers to a situation where the depth of the queue 112 increases significantly above the target level around which the queue depth should oscillate under normal conditions.

In order to address this issue, the core switch 110 may be configured to detect that the queue 112 is filled beyond a predetermined threshold and to notify the source of the traffic (e.g., the edge switch 120 or the edge switch 130) that it is necessary for the source of the traffic to slow down the rate at which the source outputs network messages. The state of the queue 112, where the queue 112 is filled beyond a predetermined threshold, may be referred to as a state of congestion. The core switch 110 thus may be referred to as a congestion point (CP), and the queue 112 to facilitate the storing and processing of the incoming messages may be referred to as the congestion point queue 112.

The core switch 110 may be configured to support one or more congestion management techniques and include a system to manage network congestion 114. One example congestion management mechanism is a so-called backwards congestion notification (BCN). BCN, in one example embodiment, relies on detecting congestion condition by monitoring the state of a congestion point queue (e.g., the congestion point queue 112) and sending a feedback message back to the source of traffic (e.g., the edge switch 120 or the edge switch 130) in response to the determined state of the congestion point queue. A network node that is configured to receive feedback messages providing information regarding network congestion (BCN messages) and selectively alter the rate of its network traffic output in response to a BCN message may be termed a reaction point (RP). The edge switch 120 and the edge switch 130 of FIG. 1 may be configured, in one example embodiment, to participate in congestion management as reaction points.

The flow of notification messages (or BCN messages) from a congestion point (e.g., the core switch 110) to a reaction point (e.g., the edge switch 120) in response to the traffic flow from the reaction point to the congestion point may be referred to as a backwards congestion notification loop (BCN loop). A network within which a BCN mechanism has been implemented may be referred to as a BCN-enabled network. In one example embodiment, the network environment 100 is a BCN-enabled network. An example notification message (sometimes also referred to as a feedback message) may include information related to the state of the congestion point queue 112). The source of the traffic, the edge switch 120 or the edge switch 130, may receive a feedback message from the core switch 110 and take appropriate measures based on the queue state information provided with the feedback message. BCN, thus, may permit shifting network traffic congestion from the core of the network towards the edge of the network, where there is less traffic aggregation and where more resources may be available to address congestion more effectively.

Network frames entering a BCN-enabled network may be tagged by the reaction point (e.g., the edge switch 120 or the edge switch 130) with a congestion management tag (CM-Tag). A CM-Tag identifies, e.g., with a FlowID value, those traffic flows to which congestion mitigation measures (or rate control measures) should be applied. Congestion mitigation measures may include, for example, lowering the rate at which network frames are transmitted from the reaction point. In one example embodiment, the edge switch 120 and the edge switch 130 may be configured to analyze the responsiveness of the network and determine the adjustment parameters to alter the rate of the output network flow based on the queue state information provided from the congestion point via a feedback message and the determined responsiveness of the network. For example, if the feedback message indicates that the congestion point queue 112 is oversubscribed and the responsiveness of the network is high, the rate of the flow may be decreased less dramatically than if the responsiveness of the network is low. The nature of the rate adjustment performed at the reaction point may be long term (semi-static), short-term (e.g., associated with a single congestion event), or even time-of-day (based on heuristics).

In one example embodiment, the system to manage network congestion 114 may be configured to monitor the depth of the congestion point queue 112. When a congestion condition is detected, the system 114 may generate and send an appropriate feedback message toward the end nodes 150 and 160. The feedback messages may be processed at the edge switches 120 and 130 that are shown to include respective rate limiters 122 and 132. It will be noted that, in some embodiments, feedback messages may be processed at end nodes 150 and 160, provided the end nodes 150 and 160 support BCN. The processing of a feedback message at a reaction point may result in the instantiation of a rate limiter, unless a rate limiter has already been installed. In one example embodiment, a rate limiter may be configured to slow down a congesting traffic flow in order to mitigate congestion at the congestion point (e.g., at the core switch 110). If congestion improves or dissipate completely, feedback messages may be generated at the core switch 110 to cause the rate limiters to increase the rate of traffic flow in order to avoid under-utilizing the bandwidth at the congestion point. In some example embodiments, the system 114 may be configured to suppress feedback messages including an indication of the lack of congestion at the core switch 110.

It will be noted, that the system 114 to manage network traffic congestion may be provided at any network device that may be subject to congestion, e.g., at the edge switch 140, at the end node 170, etc. Example components of a system to manage network traffic congestion may be described with reference to FIG. 2.

Figure 2:
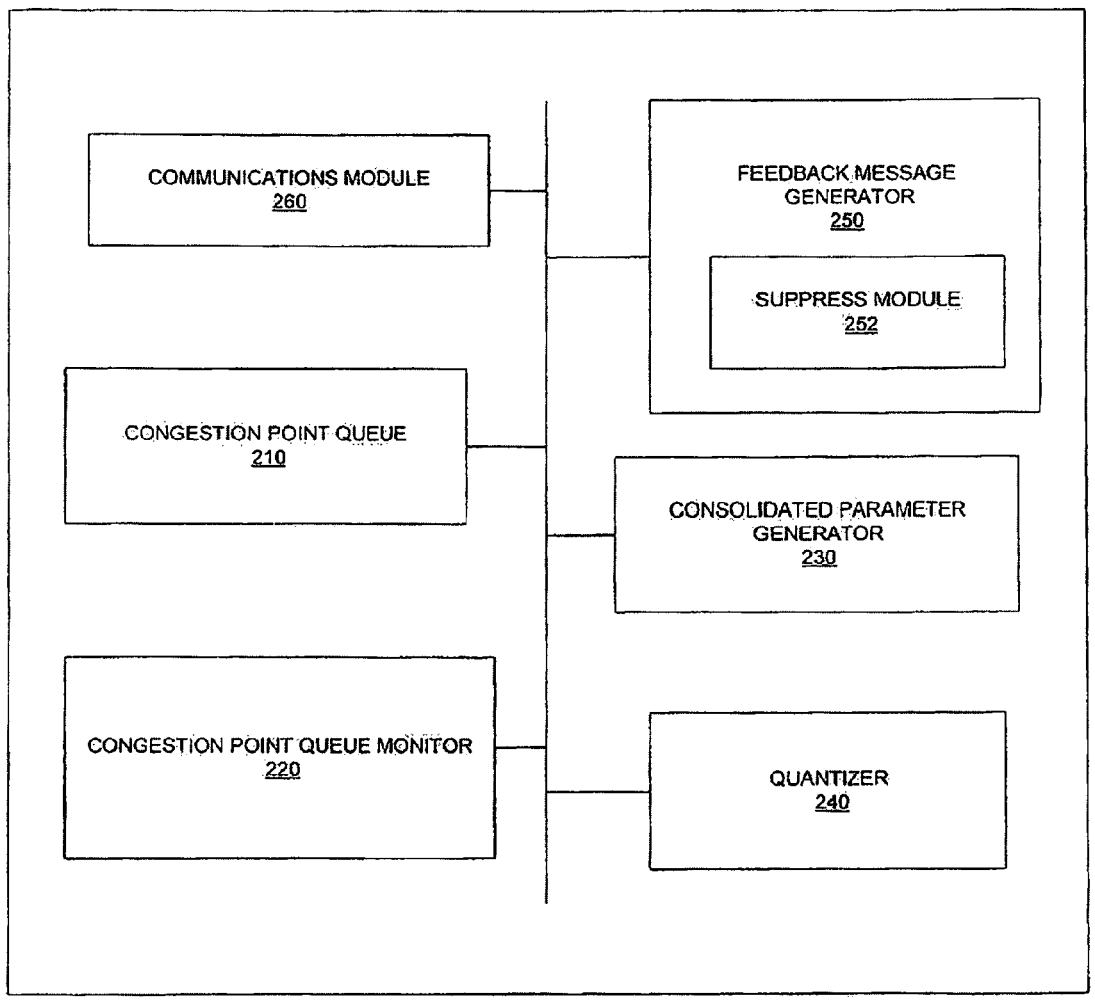
FIG. 2 is a diagrammatic representation of a system to manage network traffic congestion, in accordance with an example embodiment.

Referring to FIG. 2, a system to manage network traffic congestion 200, in one example embodiment, includes a congestion point queue 210, a congestion point queue monitor 220, a consolidated parameter generator 230, a quantizer 240, and a communications module 260. The congestion point queue 210 may be configured to queue the received network frames for further processing. The congestion point queue 210, in one example embodiment, corresponds to the congestion point queue 112 shown in FIG. 1. The congestion point queue monitor 220 may be configured to monitor the state of the congestion point queue 210. An example congestion point queue environment 300 is illustrated in FIG. 3.

Figure 3:
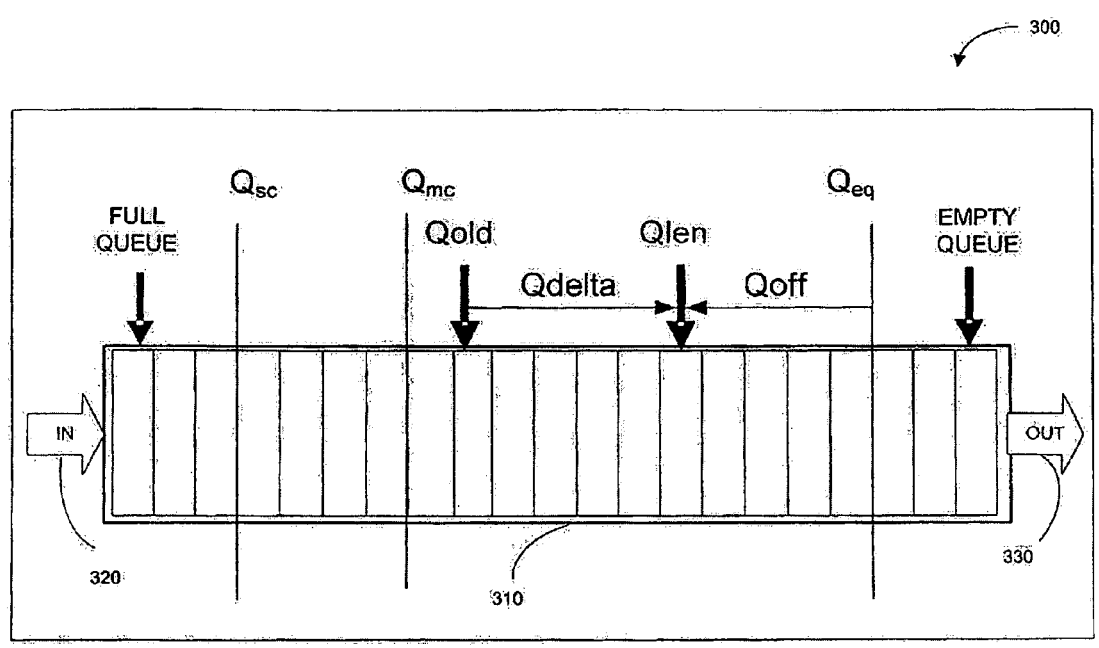
FIG. 3 is a congestion point queue environment, in accordance with an example embodiment.

As shown in FIG. 3, an equilibrium threshold Qeq defines the operating point of a queue 310 under congestion conditions. In one example embodiment, Qeq is the target level around which the queue length should oscillate under normal congestion conditions. A severe congestion threshold Qsc defines the level at which the queue is subject to extreme congestion conditions. The values corresponding to the size of the queue 310 that range between Qeq and Qsc define mild congestion conditions.

As shown in FIG. 3, incoming network frames 320 are sampled with a certain probability P, e.g., 0.01. In one example embodiment, the sampling is being performed on a byte arrival basis. Thus, if an average frame length is E[L], then a frame is sampled on average every E[L]/P byte received. If, for example, an average frame has the length of 1000 bytes, then the average sampling rate would be one frame every 100 KB of data received. Sampling may be performed, in one example embodiment, utilizing a fixed interval Sf followed by a random interval Sr. Initially, and after every sample, the sampling interval S may be calculated by adding the fixed interval Sf and the random interval Sr.

The length of every frame that arrives at the queue 310 and carries a non-zero FlowID value in the associated CM-Tag is accumulated in a length (L) variable. An incoming frame is sampled as soon as the value of L is determined to be greater than the sampling interval S. A new random interval Sr is then selected and the value of L is set to zero. The fixed interval Sf may be configurable in the range between 0 and 256 KB with 1 byte increments. The random interval Sr may be generated in the range [0, 64] KB with 1 byte increments. It will be noted that, in one example embodiment, any frame that carries a null FlowID in the CM-Tag is being ignored by the sampling process and does not contribute to the increment of the value of L. In one example embodiment, it is assumed that those frames with a null FlowID in the CM-Tag are not subject to congestion management When a network frame is sampled, the current queue length Qlen is compared with the Qsc threshold. If Qlen is greater than Qsc, the queue 310 is identified as being under severe congestion conditions. In response to determining severe congestion conditions, a special feedback message is generated at the congestion point to cause a rate limiter at the associated reaction point to temporarily drop the rate of network traffic sent from the reaction point to zero.

If the queue 310 is not operating under severe congestion conditions, the two components of the BCN feedback message, Qoff and Qdelta, are computed. As shown in FIG. 3, Qoff is the offset of the current queue length with respect to the equilibrium threshold Qeq. Qoff is considered to be saturated at +Qeq and −Qeq. Qdelta is the change in length of the queue since the last sampled frame. When it is determined that Qoff is saturated, the system to manage network traffic congestion 200 includes an indication of saturation into the feedback message (e.g., a designated Q bit in the BCN Frame may be set to a predetermined value).

The value of Qoff being positive indicates that the queue 310 is above the equilibrium threshold. In certain networks, Qeq may be set differently for different congestion points. In order to generate BCN messages carrying a normalized feedback, a scaling factor Qscale (that may also be referred as weight w) may be used to normalize one or both of the values of Qoff and Qdelta. For example, Qoff and Qdelta may be calculated as described above, and the actual BCN frame may include Qscale.Qoff and Qscale.Qdelta values. In one example embodiment, in order to reduce the size of the associated BCN frame, the values of Qoff and Qdelta may be utilized to generate a consolidated value that reflects the values of Qoff and Qdelta and include that consolidated value into the BCN frame. An example consolidated value Fb may be calculated as follows:

$$Fb = -(Qoff + w \cdot Qdelta),$$

where w is a weight parameter chosen to improve stability, responsiveness, and scalability of the control loop.

It will be noted, that a congestion point with a relatively small queue may have a lower Qeq, which, in turn, results in a relatively smaller range for the Qoff and Qdelta values being generated by such congestion point. In one example embodiment, when Qoff and Qdelta are both zero, no BCN message is being generated. A BCN frame generated by a congestion point may carry in the payload the CM-Tag copied from the sampled frame, as described below, with reference to FIG. 5. This information may be used by the reaction point to determine appropriate congestion mitigation measures.

Returning to FIG. 2, the congestion point queue monitor 220 may be configured to detect congestion, e.g., based on the state of the congestion point queue 210. As mentioned above, congestion conditions may be determined based on the predetermined equilibrium state of the queue and on the rate of change of the size of the queue. The consolidated parameter generator 230 may be configured to generate a single parameter that reflects two or more of the values associated with the state of the congestion point queue 210. In one embodiment, as discussed with reference to FIG. 3, a consolidated parameter may be generated to reflect Qoff and Qdelta.

The quantizer 240 may be configured to generate a plurality of discrete values or a plurality of ranges of values representing the state of congestion associated with the congestion point queue 210. The values determined by the congestion point queue monitor may be further processed by the quantizer 240 to determine an appropriate associated discrete value or an appropriate associated range of values. The feedback message generator 250 may be configured to generate a feedback message to provide information associated with the state of the congestion point queue 210 to the reaction point. It will be noted that, in some example embodiments, the quantizer 240 may be utilized to quantize the determined state of congestion values (e.g., Qoff and Qdelta) that may or may not be subsequently consolidated into a single parameter.

The feedback message generator 250 may be configured to generate a feedback message to be communicated to the reaction point. A feedback message generated by the feedback message generator 250 may include values that represent the state of congestion (e.g., Qoff and Qdelta) that may be quantized in some embodiments. In other embodiments, a feedback message may be generated to include a single consolidated parameter generated by the consolidated parameter generator 230 instead of two or more values that represent the state of the congestion queue 210. The consolidated value may be quantized as mentioned above.

The feedback message generator 250, in one example embodiment, includes a suppress module 252. The suppress module 252 may be configured to suppress a feedback message indicative of a decrease in congestion that warrants an increase of the rate at which the network traffic is sent from the reaction point to the congestion point. In some embodiments, the suppress module 252 may suppress the generation of an associated feedback message, while in other embodiments the suppress module 252 may not affect the generation of an associated feedback message but suppress the communication of the feedback message to the reaction point. The communications module 260 may be configured to receive network frames from other network devices and to send feedback messages to the reaction point.

Thus, when the congestion point queue monitor 220 samples a frame to determine the current state of the congestion point queue, the consolidated generator 230 generates a consolidated parameter that may be quantized. The consolidated parameter may be included into a feedback message generated by the feedback message generator 250 and communicated to the reaction point. Example operations performed by the congestion management system 200 may be described with reference to FIG. 4.

Figure 4:
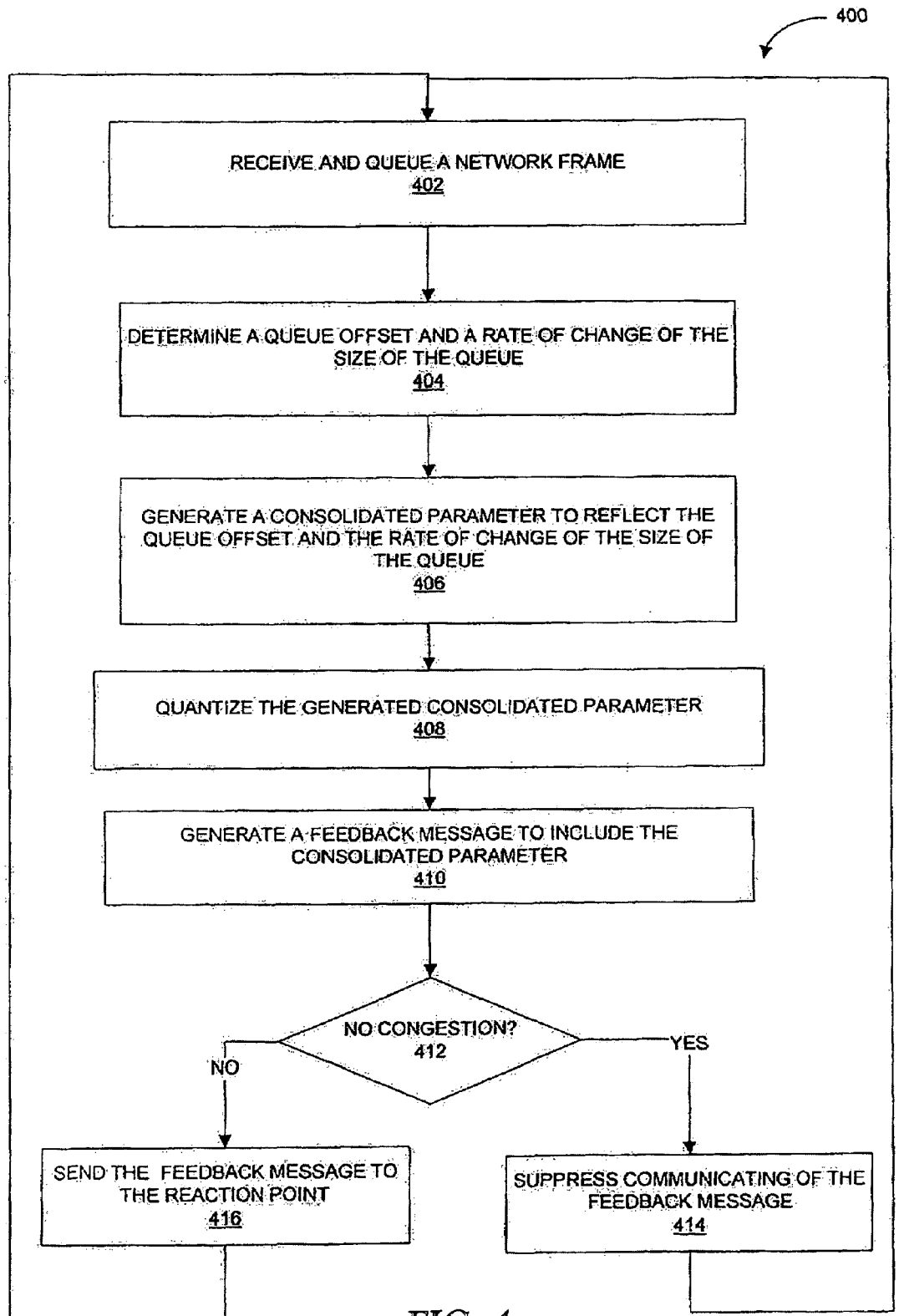
FIG. 4 is a flow chart of a method to manage network traffic congestion, in accordance with an example embodiment.

FIG. 4 is a flow chart of a method 400 to manage network congestion, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the method 400 may be performed by the various modules discussed above with reference to FIG. 2. Each of these modules may comprise processing logic.

As shown in FIG. 4, at operation 402, the communications module 260 receives a network frame from a reaction point and queues it in the congestion point queue 210. The congestion point queue monitor 220 samples a frame to determine the current state of the congestion point queue 210, at operation 404. In one example embodiment, the state of the congestion point queue 210 maybe represented by a queue offset that reflects a deviation from a predetermined equilibrium queue level (queue offset or Qoff) and a rate of change of a size of the congestion point queue 210 (queue delta or Qdelta). An equilibrium queue level, in one example embodiment, may be selected to represent a particular size of the congestion point queue that is considered a desirable size. At operation 406, the consolidated parameter generator applies one or more predetermined functions to the determined queue offset and queue delta to generate a consolidated parameter that reflects both of these values. The consolidated parameter may be quantized at operation 408 prior to being included in a feedback message. At operation 410, the feedback message generator 250 includes the consolidated parameter into a feedback message.

As mentioned above, the system 200 may be configured to suppress feedback messages that would result in the increase of the rate of the network traffic flowing from the reaction point. At operation 412, the suppress module 252 determines whether the feedback message is indicative of the lack of congestion (or whether the communication of the feedback message that includes the consolidated parameter to the reaction point may cause the rate increase at the reaction point). If the lack of congestion is determined, at operation 412, based on the state of the congestion queue 210, the suppress module 252 suppresses the communicating of the feedback message at operation 414. Otherwise, the communications module 260 sends the feedback message to the reaction point at operation 416.

As mentioned above, the exchange of messages between a device where congestion is detected (congestion point) and a device where congestion mitigation measures are put in place (reaction point) may be performed utilizing a CM-Tag. The frames entering a BCN-enabled network may be tagged by the reaction point with a CM-Tag. A CM-Tag, in one example embodiment, identifies traffic flows that are subject to rate control. Thus, if a congestion point receives a frame without a CM-Tag, an exception flag may be raised, which may cause the frame to be dropped. A CM-Tag may also denote a particular traffic flow that cannot be rate-limited (e.g., network control traffic).

When congestion is detected at a congestion point, a congestion management system starts generating and sending feedback messages to the reaction point(s) associated with the traffic flows that is believed to have caused congestion. The feedback message, in one example embodiment, is an Ethernet frame known as the BCN Frame. An example format of a BCN frame 500 may be described with reference to FIG. 5.

A feedback message represented by the BCN frame 500 may be generated by a congestion point in response to sampling incoming network traffic, as described above, e.g., with reference to FIG. 4. In one example embodiment, the BCN Frame 500 includes a Destination Address (DA) that may be equal to the Source Address of the sampled frame. A Destination Address may be stored in a DA field 502. A Source Address (SA), which is equal to a Media Access Control (MAC) address associated with the congestion point, is stored in field 504. Thus, the BCN Frame may be forwarded back to the source of the traffic causing congestion with a valid source address.

Field 506 includes the IEEE 802.1 Q Tag or S-Tag, which may be copied from the sampled frame. Field 506 of the BCN Frame (802.1Q Tag or S-Tag, sometimes referred to as a priority field of the BCN Frame) is set, in one embodiment, either to the priority of the sampled frame or to a configurable priority value. The S-Tag in the field 506 may be set to the highest priority in order to minimize the latency experienced by BCN Frames.

Field 508 may be optionally added to the BCN frame 500 to carry a Security Group Tag (SGT). The SGT may contain a value specifically assigned to the congestion point that originates the BCN frame. Such value may be drawn from a configuration register in the congestion point register block. In one example embodiment, the SGT may be inserted into the BCN frame 500 only if the sampled frame also carries a SGT.

Figure 5:
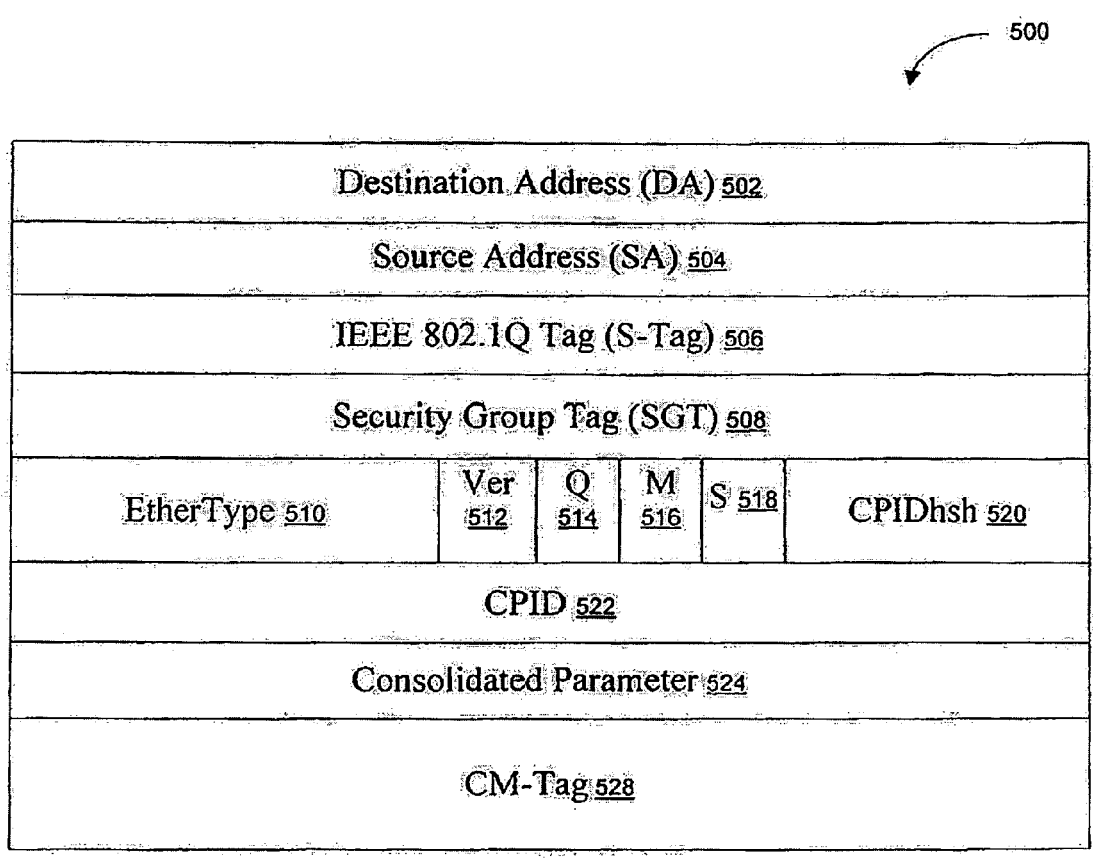
FIG. 5 is a BCN frame, in accordance with an example embodiment.

Field 510 is shown in FIG. 5 to include the Ethertype of the BCN Frame. The Ethertype value may be set to an interim value of 0xBC4E, identifying the frame as being a BCN feedback message. The BCN Ethertype, in one example embodiment, is distinct from the CM-Tag Ethertype.

The Version field 512 indicates the version of the BCN protocol. The three fields that follow may be utilized to alter the semantics of the BCN feedback message when set. The Q field 514 indicates that the field storing Qdelta value (described above with reference to FIG. 3) has saturated. In one example embodiment, the Qdelta field is saturated when its value is equal to −2Qeq or 2Qeq. An M field 516, in one example embodiment, indicates a condition of mild buffer congestion, while an S field 518 indicates a condition of severe buffer congestion.

A CPIDhsh field 520 is used to carry a hash value associated with a Congestion Point Identifier (CPID) field 522 that follows. The CPIDhsh field 520 may be utilized to minimize the amount of false positive feedback messages generated by multiple congestion points along the path from a source device to a destination device. The CPID field 522 may be utilized to univocally identify a congested entity (e.g., a congestion point queue) within a contiguous set of devices that support BCN. A contiguous set of devices that support BCN is sometimes referred to as a Congestion Management Domain. CPID information may be propagated to the reaction point in order to create a bi-univocal association between the congestion point and one or more reaction points. Because the CPID is an opaque object, the format of the CPID may be only relevant to the congestion point that assigns it. In order to ensure global uniqueness, the CPID may include the MAC address of the switch with which the congestion point is associated. The CPID may also include a local identifier to ensure local uniqueness.

A Consolidated Parameter field 524 may include the actual feedback information conveyed by the congestion point to the reaction point represented by a value that reflects the queue offset (Qoff) and the queue delta (Qdelta) determined by the congestion point queue monitor 220. As described above, with reference to FIG. 3, the value of Qoff is the offset of the current length of the congestion point queue 210 with respect to the equilibrium threshold Qeq. The value of Qdelta is the change in length of the queue 310 since the last sampled frame. The payload of a BCN Frame (field 528) comprises the CM-Tag, including its Ethertype, copied from the sampled frame. The payload 528 may convey information that may be utilized at the reaction point to determine an appropriate congestion mitigation action.

When a reaction point receives a feedback message (e.g., a BCN frame) from a congestion point, and the feedback message causes a congestion mitigation action to be performed on a particular traffic flow (e.g., the activation of a rate limiter or an adjustment of one or more parameters of the rate limiter), the CPID field 522 and the CPIDhsh field 520 from the BCN Frame may be stored in local registers associated with the corresponding rate limiter. The network flow frames that may be subsequently injected by the reaction point in the network will carry a CM-Tag with a Rate Limited Tag (RLT) Option containing the CPIDhsh from the local register at the reaction point. The BCN frame 500 may also include other fields, not shown in FIG. 5.

As mentioned above, with reference to FIG. 1, a reaction point (e.g., the edge switch 120) may have a rate limiter installed at it (e.g., the rate limiter 122) to alter the rate at which the network traffic flows from the reaction pint to the congestion point (e.g., the core switch 110). In one example embodiment, the rate limiter 122 may be configured to support a so-called discounted rate increase mechanism, where the rate limiter 122 takes into account the number of rate decrease signals received from the core switch 110 between the rate increase episodes.

For example, when a number of successive feedback messages from the core switch 110 that were indicative of congestion conditions may cause a rate decrease at the edge switch 120. At some point, e.g., after a predetermined period of time during which no feedback massages indicative of congestion conditions were received, the edge switch 120 and the rate limiter 122 in particular may initiate rate increase commands to cause the increase of the rate at which the network frames flow from the edge switch 120 the core switch 110. In one example embodiment, the command to cause the increase of the rate at the edge switch 120 is generated based on the number of previous successive rate decrease requests received from the core switch 110. The more successive rate decrease requests have been received from the core switch 110, the less is the amount by which the rate is increased the next time a rate increase command is generates. In another embodiment, the edge switch 120 is configured such that the more successive rate decrease requests have been received from the core switch 110, the greater are the time intervals between the rate increase messages the next time a rate increase command is generated.

It will be noted, that while the embodiments of the inventive techniques have been described with reference to BCN, the techniques manage network traffic congestion described herein may be utilized with congestion management systems other than BCN, e.g., in the context of explicit congestion notification (ECN) techniques.

Figure 6:
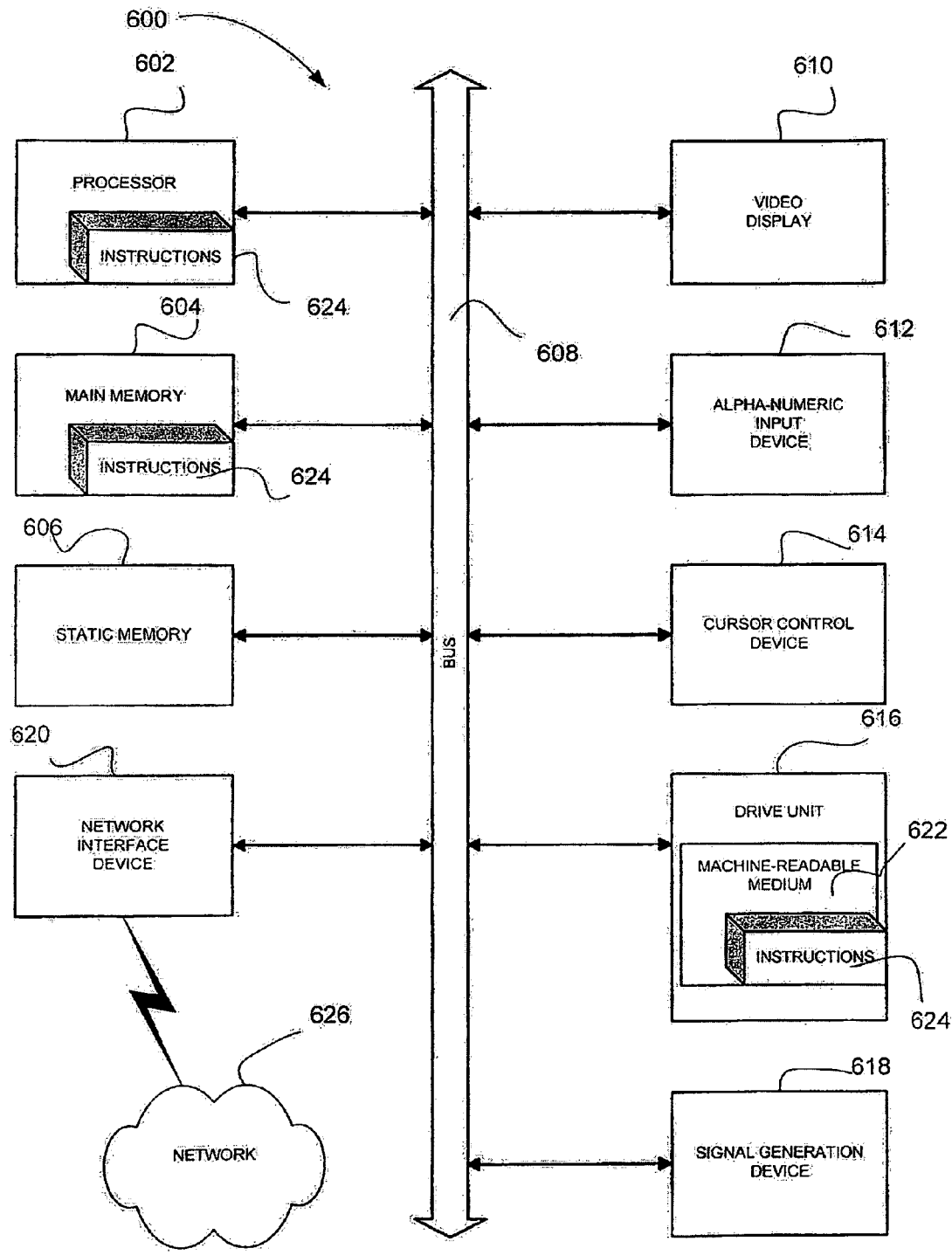
FIG. 6 illustrates a diagrammatic representation of an example machine in the form of a computer system within which a set of instructions, for causing the machine to perform any one or more of the methodologies discussed herein, may be executed.

FIG. 6 shows a diagrammatic representation of machine in the example form of a computer system 600 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), optionally a user interface (UI) navigation device 614 (e.g., a mouse), optionally a disk drive unit 616, a signal generation device 618 (e.g., a speaker), and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols, e.g., a Hyper Text Transfer Protocol (HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Thus, a method and system to manage network traffic congestion have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to manage network traffic congestion, the system comprising:
a congestion point queue, the congestion point queue being to queue messages from a reaction point to a congestion point;
a monitor to sample a state of the congestion point queue, the state of the congestion point queue reflected by:
an equilibrium queue level, the equilibrium queue level to represent a particular size of the congestion point queue,
a queue offset, the queue offset to represent a deviation from the equilibrium queue level, and
a rate of change of a size of the congestion point queue;
a consolidated parameter generator to generate a consolidated feedback parameter, the consolidated feedback parameter to reflect the queue offset and the rate of change of the size of the congestion point queue; and
a feedback message generator to generate a feedback message, utilizing the consolidated feedback parameter.

2. The system of claim 1, wherein the consolidated feedback parameter is a quantized consolidated feedback parameter.

3. The system of claim 2, comprising a quantizer to generate a set of discrete feedback parameter values, wherein:
the feedback message generator is configured to determine a value from the set of discrete feedback parameter values that is nearest to the consolidated feedback parameter; and
the feedback message generator is configured to include in the feedback message the value from the set of discrete feedback parameter values that is nearest to the consolidated feedback parameter.

4. The system of claim 3, wherein the set of discrete feedback parameter values are non-uniformly distributed.

5. The system of claim 2, comprising a quantizer to generate a set of feedback parameter ranges, wherein:
the feedback message generator is configured to determine a feedback parameter range from the set of feedback parameter ranges for the consolidated feedback parameter; and
the feedback message generator is configured to include in the feedback message a value indicative of the determined feedback parameter range.

6. The system of claim 1, wherein consolidated parameter generator is configured to generate the consolidated feedback parameter utilizing the rate of change of the size of the congestion point queue, the rate of change of the size of the congestion point queue being weighted in accordance with a selected weight parameter.

7. The system of claim 1, wherein the feedback message generator is configured to:
determine that the consolidated feedback parameter is indicative of a rate increase; and
suppress generating of the feedback message.

8. The system of claim 1, wherein the feedback message generator is configured to:
determine that the consolidated feedback parameter is indicative of a rate increase; and
suppress communicating of the feedback message.

9. The system of claim 1, wherein the congestion point is associated with a network switch.

10. The system of claim 1, comprising a communications module to communicate the feedback message to the reaction point.

11. A method to manage network traffic congestion, the method comprising:
queuing messages from a reaction point to a congestion point in a congestion point queue;
sampling a state of the congestion point queue, the state of the congestion point queue reflected by:
an equilibrium queue level, the equilibrium queue level to represent a particular size of the congestion point queue,
a queue offset, the queue offset to represent a deviation from the equilibrium queue level, and
a rate of change of a size of the congestion point queue;
generating a consolidated feedback parameter, the consolidated feedback parameter to reflect the queue offset and the rate of change of the size of the congestion point queue;
generating a feedback message, utilizing the consolidated feedback parameter; and
communicating the feedback message to the reaction point.

12. The method of claim 11, comprising quantizing the consolidated feedback parameter to provide a quantized consolidated feedback parameter.

13. The method of claim 12, comprising:
generating a set of discrete feedback parameter values;
determining a value from the set of discrete feedback parameter values that is nearest to the consolidated feedback parameter; and
including in the feedback message the value from the set of discrete feedback parameter values that is nearest to the consolidated feedback parameter.

14. The method of claim 13, wherein generating of the set of discrete feedback parameter values comprises generating the set of discrete feedback parameter values that are non-uniformly distributed.

15. The method of claim 12, comprising:
generating a set of feedback parameter ranges;
determining a feedback parameter range from the set of feedback parameter ranges for the consolidated feedback parameter; and
including in the feedback message a value indicative of the determined feedback parameter range.

16. The method of claim 11, wherein the generating of the consolidated feedback parameter comprises applying a weight function to the rate of change of the size of the congestion point queue.

17. The method of claim 11, comprising:

determining that the consolidated feedback parameter is indicative of a rate increase; and suppressing communicating of the feedback message.

18. The method of claim 11, wherein the congestion point is associated with a network switch.

19. The method of claim 11, comprising communicating the feedback message to the reaction point.

20. A non-transitory machine-readable medium having stored thereon data representing sets of instructions which, when executed by a machine, cause the machine to:

queue messages from a reaction point to a congestion point in a congestion point queue;

sample a state of the congestion point queue, the state of the congestion point queue reflected by an equilibrium queue level, the equilibrium queue level to represent a particular size of the congestion point queue, a queue offset, the queue offset to represent a deviation from the equilibrium queue level, and a rate of change of a size of the congestion point queue;

generate a consolidated feedback parameter, the consolidated feedback parameter to reflect the queue offset and the rate of change of the size of the congestion point queue; and generate a feedback message, utilizing the consolidated feedback parameter.

* * * * *